United States Patent [19]

Paseman

[11] Patent Number: 5,745,765
[45] Date of Patent: Apr. 28, 1998

[54] METHOD AND APPARATUS FOR AUTOMATIC AND INTERACTIVE CONFIGURATION OF CUSTOM PRODUCTS

[75] Inventor: William Gerhard Paseman, San Jose, Calif.

[73] Assignee: Calico Technology, Inc., San Jose, Calif.

[21] Appl. No.: 547,025

[22] Filed: Oct. 23, 1995

[51] Int. Cl.$^6$ .............................. G06F 9/455; G06F 9/44
[52] U.S. Cl. .................................. 395/701; 395/500
[58] Field of Search ........................ 395/700, 500, 395/701

[56] References Cited

U.S. PATENT DOCUMENTS

| | | | |
|---|---|---|---|
| 4,591,983 | 5/1986 | Bennett et al. | 395/710 |
| 5,263,148 | 11/1993 | Jones, Jr. et al. | 395/500 |
| 5,353,432 | 10/1994 | Richek et al. | 395/500 |
| 5,408,665 | 4/1995 | Fitzgerald | 395/65 |
| 5,515,524 | 5/1996 | Lynch et al. | 395/500 |
| 5,546,595 | 8/1996 | Norman et al. | 395/800 |

*Primary Examiner*—Alvin E. Oberley
*Assistant Examiner*—Kakali Chaki
*Attorney, Agent, or Firm*—Townsend and Townsend and Crew; Henry K. Woodward

[57] ABSTRACT

A method for configuring a product from a plurality of selectable components includes establishing for each component a list of available classes, defining specific properties for each class of each component, defining constraints among components based on said specific properties, selecting a first plurality of components for a product configuration, identifying each of said first plurality of components as selectable, eliminated, or contradicted based on said constraints, and altering said product configuration to avoid eliminated and contradicted components. The method permits computer added design of a system which allows interactive participation of the designer in identifying required components for a redesign when an initial design is inoperable.

14 Claims, 4 Drawing Sheets allowed values

| boat | $10 | blue |
| game | $20 | brown |
| doll | $15 | pink |

*FIG. 4A*

"A" radio button

| ◆ | boat | selected |
| ◇ | game | selectable |
| ◇ | doll | eliminated |

*FIG. 4B* popup

"B" | boat ▽ |

| selected | ● | boat | $10 |
| selectable | ○ | game | $20 |
| eliminated | × | doll | $15 |

*FIG. 4C* popup

| none ▽ | contradiction

| ! | boat | $10 |
| ○ | game | $20 |
| ! | doll | $15 |

*FIG. 4D*

METHOD AND APPARATUS FOR AUTOMATIC AND INTERACTIVE CONFIGURATION OF CUSTOM PRODUCTS

BACKGROUND OF THE INVENTION

This invention relates generally to the configuration of custom products using selectable components, and more particularly the invention relates to automated configuration which allows interactive participation of a designer.

Suppliers of industrial products often have a large variety of component parts which can be used in various configurations in different applications. Typically, each component has specific properties which can be used advantageously with some other components for a desired application but which make the component incompatible for use with other components. When a new application of the components is being considered, realization of an optimum configuration design can be difficult and time consuming in selecting and assembling the various components. Heretofore, computer programs have been available which can quickly advise the system designer if a proposed design is operable or inoperable. However, if the design is inoperable the necessary redesign and new component specifications have not been readily discernible.

SUMMARY OF THE INVENTION

The present invention is directed to computer automated design of a system which allows interactive participation of the designer in identifying required components for a redesign when an initial design is inoperable. The invention allows product families which might number in the thousands of parts to be easily described in a limited number of expressions. In contrast, thousands of lines of software code would be necessary in describing the individual parts, which requires expensive maintenance each time product lines are updated.

Briefly, for each component a list of available classes or types is established. Specific properties for each class are then defined. Constraints in using the various classes of components with other components are then defined using the properties as constrained variables, for example, in the form of Boolean relationships.

An initial product specification is specified using an initial selection of classes of components. Each component of the initial configuration is then identified as selectable, eliminated, or contradicted based on the constraints.

A feature of the invention allows the designer to identify the properties of components which cause any one component to be eliminated or contradicted. This aids the designer in selecting another class of the component for use in the product configuration.

The invention and objects and features thereof will be more readily apparent from the following detailed description and appended claims when taken with the drawings.

BRIEF DESCRIPTION OF THE DRAWINGS

FIGS. 4A–4D illustrate computer monitor views which aid in analyze product configurations.

DESCRIPTION OF THE PREFERRED EMBODIMENT

Figure 1:
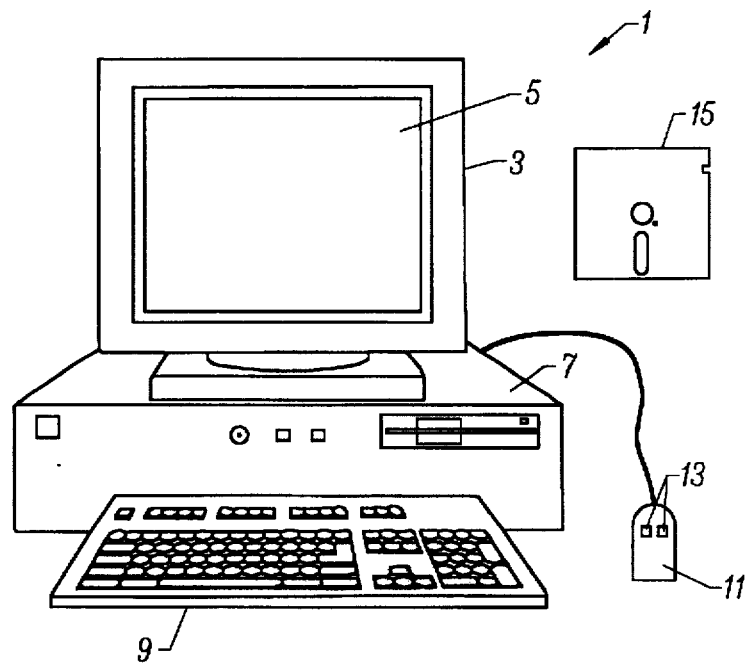
FIG. 1 illustrates a computer system used to execute the product design accordance with the invention.

The configuration of custom products in accordance with the invention is readily implemented with software in a computer system such as illustrated in FIG. 1. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a floppy disk drive 14, and a hard drive (not shown) that may be utilized to store and retrieve software programs incorporating the present invention. Although a floppy disk 15 is shown as the removable media, other removable tangible media including CD-ROM and tape may be utilized. Cabinet 7 also houses familiar computer components (not shown) such as a processor, memory, and the like.

Figure 2:
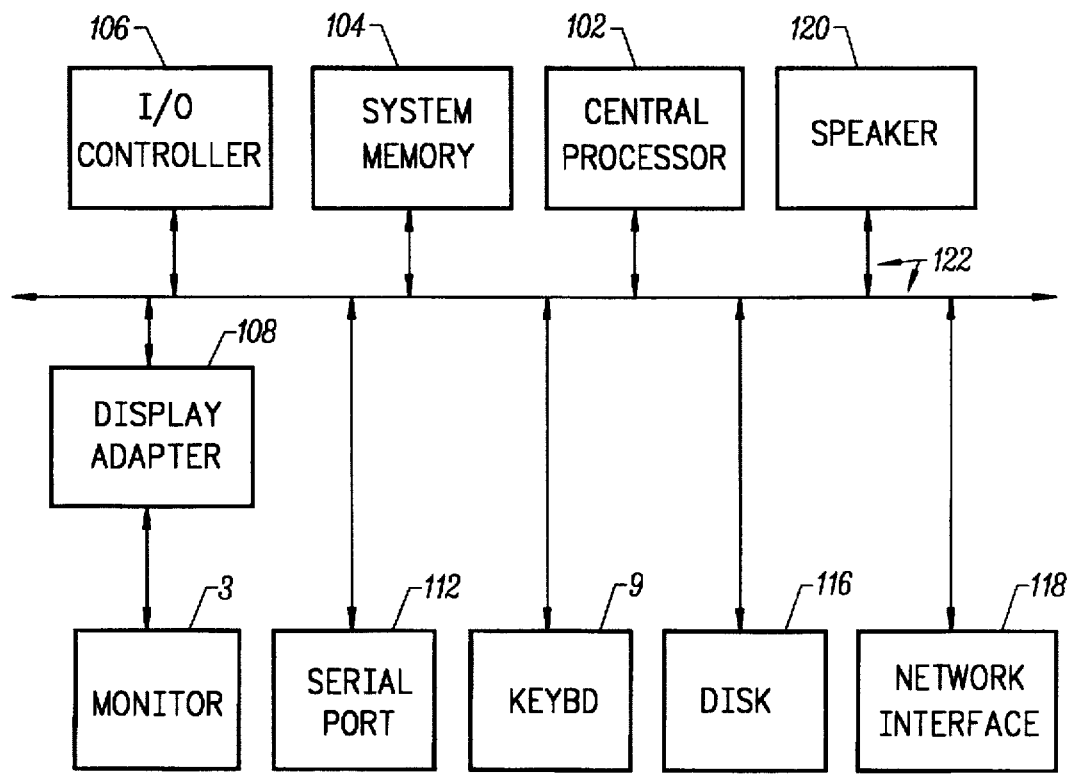
FIG. 2 is a functional block diagram of the computer system of FIG. 1.

FIG. 2 shows a system block diagram of a computer system 1 used to execute the software of the present invention. As in FIG. 1, computer system 1 includes monitor 3 and keyboard 9. Computer system 1 further includes subsystems such as a central processor 52, system memory 54, I/O controller 56, display adapter 58, serial port 62, disk 64, network interface 66, and speaker 68. Other computer systems suitable for use with the present invention may include additional or fewer subsystems. For example, another computer system could include more than one processor 52 (i.e., a multi-processor system) or memory cache.

Arrows such as 70 represent the system bus architecture of computer system 1. However, these arrows are illustrative of any interconnection scheme serving to link the subsystems. For example, speaker 68 could be connected to the other subsystems through a port or have an internal direct connection to central processor 52. Computer system 1 shown in FIG. 2 is but an example of a computer system suitable for user with the present invention. Other configurations of subsystems suitable for use with the present invention will be readily apparent to one of ordinary skill in the art.

The software program in accordance with the invention uses constraint-based programming. This is a relatively new branch of artificial intelligence (AI) and is increasingly used for the rapid creation of applications due to its declarative nature and its relative tractability. Three key elements of constraint-based programs are constrained variables, domains, and constraints. Constrained variables are similar to enumerated variables in other languages. Domains define discrete allowed values that the constrained variables can assume. For example, there can be a general class of light called stop light, which can only assume the values of red, green, and yellow. Assume two such lights, one on Main Street northbound, and one on Main Street westbound, which become two constrained variables of the type stop light which are defined over the same domain: red, green, and yellow.

Constraints can be Boolean relationships between constrained variables. For example, the relationship (Main Street northbound <>Main Street westbound) is a constraint in that the value assumed by the variable Main Street northbound can never equal the value assumed by the variable Main Street westbound.

Figure 3A:
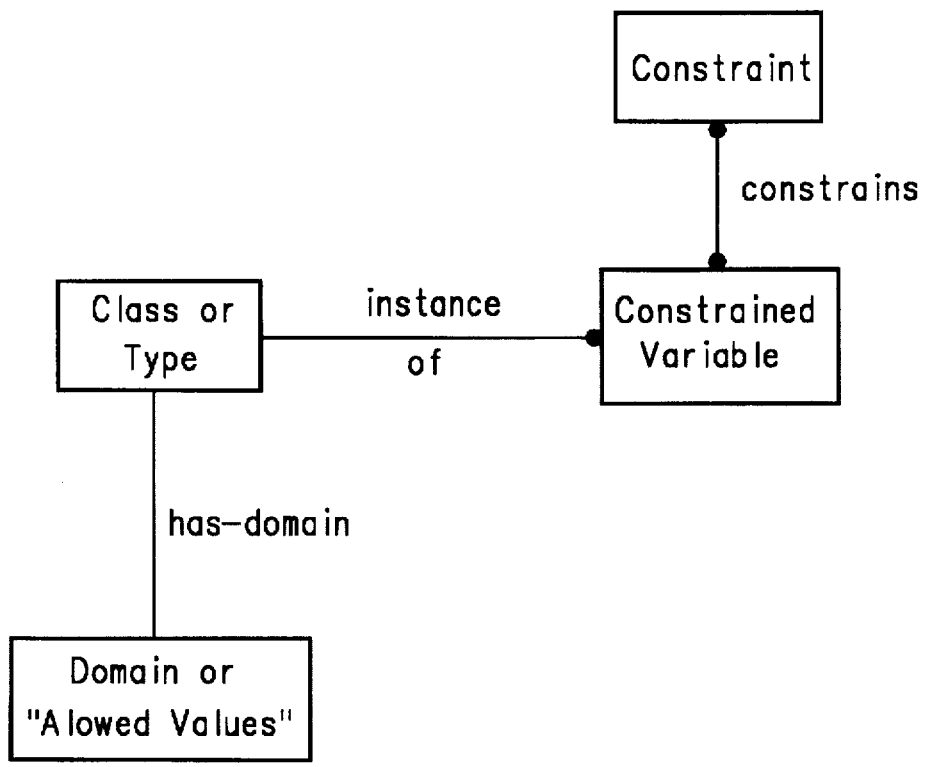
FIG. 3A is a design illustrating concepts of the invention.
Figure 3B:
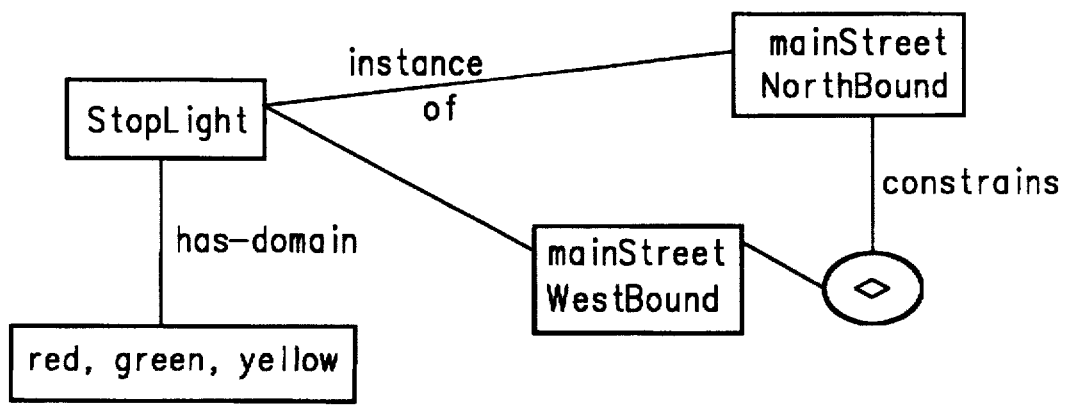
FIG. 3B illustrates one application of the diagram.

The general diagram of the relationships is shown in FIG. 3A, and the diagram for the stop light class given above is shown in FIG. 3B.

The present invention utilizes the implementation of constraints and how applications can interface with constraint networks. One feature in realizing the invention is the mapping of constraints to objects. While the prior art concentrates on defining individual variable values, the invention integrates constraint based reasoning with an object system. In particular, constrained variables correspond directly to a class instances. In addition, instead of individually restricting property values of each instance, the invention restricts the complete set of values of an instance at once.

For example, suppose that a toy class has the properties of name, price, and color. Instead of saying that the properties are restricted to name, (boat, doll, game), price ($10, $15, $20) and color (blue, pink, brown); the invention would define instances of toy as restricted to the three values <boat, $10, blue>, <doll, $15, pink>, <game, $20, brown>. This requires the writing of far fewer constraints than in other prior art systems.

In accordance with another feature of the invention, a computer monitor view provides a mapping between the domain of a constrained variable and commonly used UI objects such as pop-ups, combo boxes, fields, and the like. This allows the user to quickly create an intuitive user interface with the program. The essence of the view is simple: one can visualize allowed values of a class as being a relational "table" with rows and columns. The user then indicates what properties are to be mapped to what display choice. Then one item can be dynamically created in the display for each item in the table.

Items in the display can have several states:

User Selected—selected explicitly by the user

System Selected—selected explicitly by the system

System Eliminated—eliminated by the system

Item Contradicted—simultaneously selected (user or system) and eliminated

Variable Contradicted—two different items are simultaneously selected in a variable which allows only a single selection Selectable—neither selected, eliminated, or contradicted. With these concepts of the views in mind, FIGS. 4A-4D illustrate several views for display. FIG. 4A illustrates allowed values for three classes of toys: boat, game, doll. Assume that two variables A and B are both in the same state, boat is selected, game is selectable, and doll is eliminated. FIG. 4B is a radio button view illustrating this state by mapping selected items to be "filled in" diamonds, selectable items to be "non-filled in" diamonds, and eliminated items to be "grayed out" items. A pop-up view is shown in FIG. 4C, but whereas FIG. 4B only displayed the name column from the allowed value table, the user has specified that the pop-up display both the name and price columns. Here, the pop-up view maps selected items to be "filled-in" circles, selectable items to be "non-filled in" circles, and eliminated items to be "X-ed out" items. FIG. 4D is a view for mapping a contradiction. When a contradiction occurs the entire control is usually shaded red.

In accordance with a feature of the invention, the designer is allowed to select grayed out or eliminated items. When this is done it causes a contradiction and all display items participating in the contradiction turn red. By showing all items that participate in the contradiction the designer is guided in all the new choices of components. Additionally, all variables can have a default value. This allows the propagation of constraints without search, which in turn improves the performance of the constrained propagation.

Defaults are picked by the user on a per variable basis, and they can be chosen dynamically by the system based on an ordering specified by the user (e.g., "boat", "doll", "game"). The system dynamically picks the first item on the list that has "selectable" for the value of the variable. In defining constraints, configuration choices heretofore defined as rules are rewritten. For example, a rule may specify "if slots provided by chassis are greater or equal than slots required by cards, then signal error". This is converted to a constraint by simply using the rule condition "slots provided by chassis must be greater than or equal to slots required by cards."

Consider now an application of the invention using the concept of containment. Containment is a common product modeling situation where one has a component or group of components that fit inside one another. Often the component that houses the other components has certain requirements that must be accounted. For example, a card cage (a box into which memory and processing cards are inserted) has a limited number of card slots. Therefore, a constraint relationship has to be established to ensure that the number of card slots required by the cards placed in the cage is always equal to or less than the number of card slots provided by the cage.

First, classes of components must be established. The following table identifies three classes or models of card cages:

| Card_cage class Model number | Slots Provided |
| --- | --- |
| Chassis_KL4 | 4 |
| Chassis_KL8 | 8 |
| Chassis_IV4 | 4 |

Thus the three models of card cage component make up the classes of card cages. Specific brands of card cages that a customer can buy are called "allowed values."

Next, each of the three classes has specific properties. One property of a card cage is how many card slots it provides. In the table above two classes of card cages have four slots each while one class provides eight slots.

One property of memory and processor cards is the number of card slots they require within the card cage. The following are tables for classes of memory cards and processor cards, respectively:

| Model number | Slots Required |
| --- | --- |
| Memory_Card | |
| Western_4MB | 1 |
| Intel_8MB | 2 |
| Intel_16MB | 4 |
| Processor_Card | |
| MIPS_040 | 1 |
| MIPS_050 | 2 |
| $MIPS_{13}$ 060 | 3 |

When analyzing properties that involve containment problems, where one class contains another, it is useful to think of properties in terms of what they provide, or what they require.

Instances are the particular models or brands of the product components that make up a class, as noted in the model numbers in the above tables.

Menus can be defined for viewing a class in the computer. These are then used in the system layout.

In defining constraints between components based on the specific properties, relationships provide the logic system for the model. Instance to instance relationship is the most basic kind of relationship. One basic example of an instance to instance relationship is to tell the product model to automatically select an allowed value of a product component upon the selection of a master component. For example, one could set up the system that upon selecting Chassis_KL4 from the card cage class window, the model automatically selects the MIPS 040 processor card. An instance to instance relationship like this might be useful to establish a tie between a component and a cable that is required by that component, thus ensuring that the cable is not forgotten in the product package. Another type of instance relationship is elimination. One can set up the models so that an RHS allowed value is eliminated as an option upon selection of an LHS allowed value. Although an entire product model could be constructed based on instance relationships, it would be very time consuming and require much computer space. This translates to a product model that is extremely difficult to update. In accordance with the invention constraint relationships provide a much more efficient way of establishing ties between class instances.

In building a simple constraint, first consider the nature of the model. Card cages provide a limited number of card slots. The memory card and processor card must be provided within the cage. Thus the number of slots provided by the card cage must be greater than or equal to the total number of slots required by the memory card and the processor card combined. If the equation is written in standard infix notation, it looks like the following:

Card_Cage:SlotsPrv>=(Memory_Card:SlotsReq+Processor_Card:SlotsReq) When converting the equation to prefix form, it looks like this:

(>=Card_Cage:SlotsPrv (+Memory_Card:SlotsReq Processor_Card:SlotsReq))

Note that each component (card_cage, memory_card, processor_card) in the equation is described by a property (SlotsPrv or SlotsReq). In building constraint relationships, the properties among product components are related.

From the foregoing the basic procedures or product modeling are established. Consider now the concept of compatibility. Compatibility ensures that one component is compatible or usable with another component. Like the containment model, the properties established in a compatibility model can be expressed in terms of Prv (provided) and Req (required). Assume that there are two items each available in different colors. Certain colors are compatible with one item while other colors are not. An item A can be purchased in red, blue, or yellow while item B must be purple, blue, or orange. A model is to be designed that, upon selecting one of the items, will eliminate all colors that are not compatible for that item. Thus, if item A is chosen, the colors red, yellow, and blue are selectable while orange and purple are eliminated. Upon selecting item B, purple, orange, and blue are available while red and yellow are not. Thus certain colors are compatible with certain sets or vice versa.

| Item | Color |
|---|---|
| Item A | blue, red, yellow |
| Item B | blue, purple, orange |

Note that there are two classes, item and color. Two pop-up menus can be provided in a final model screen as well. From the item class, the user selects either item A or B and the program informs the user which colors are compatible with that selection.

The first step is to establish the classes for the model. Two classes, color and item are present in this example. Thereafter, the property that needs to be established is color provided. As for the colors, each color provides itself; red provides red, purple provides purple, and orange provides orange. Therefore, the property that needs to be established is color provided. In working with compatibility problems, the majority of time one uses string property types. As for the class item, each item is compatible with one of three colors. Therefore, each item requires three colors as options. The specifying of instances for the class, color, is simply a matter of listing the total colors available.

The compatibility relationship is a type of constraint relationship. A string index (Str-index) tells the system to take the first part of an equation and search for that part within the second part of the equation. The first part must be smaller in order that it be contained within the second part. The final equation for color is:

(Str-index ?Color:ColorPrv ?Item:ColorReq)

This equation tells the system to search for color within the list of color options for an item. The equation works forwards and backwards. If a color is chosen first, a compatible set for that color becomes selectable. If an item is selected first, a compatible color will be selectable. In using string index equations, the system starts the search process from the smallest component of the equation and searches for it within the larger component. Notice that the property values that are entered under the property color Prv are all single words (red, yellow, blue, purple and orange). The system searches for these individual pieces of information within the larger list of property values for color Req, which for item A is red, yellow, blue (all three together) and for item B is purple, blue, orange. If the equation were written with the larger component coming before the smaller one, upon selecting item A the system would search for the information "red, blue, yellow" among individual color instances like "red", "orange", or "blue" and would never find a match because the system reads "red, yellow, blue" as one chunk of information and can never find it within individual words.

Figure 5:
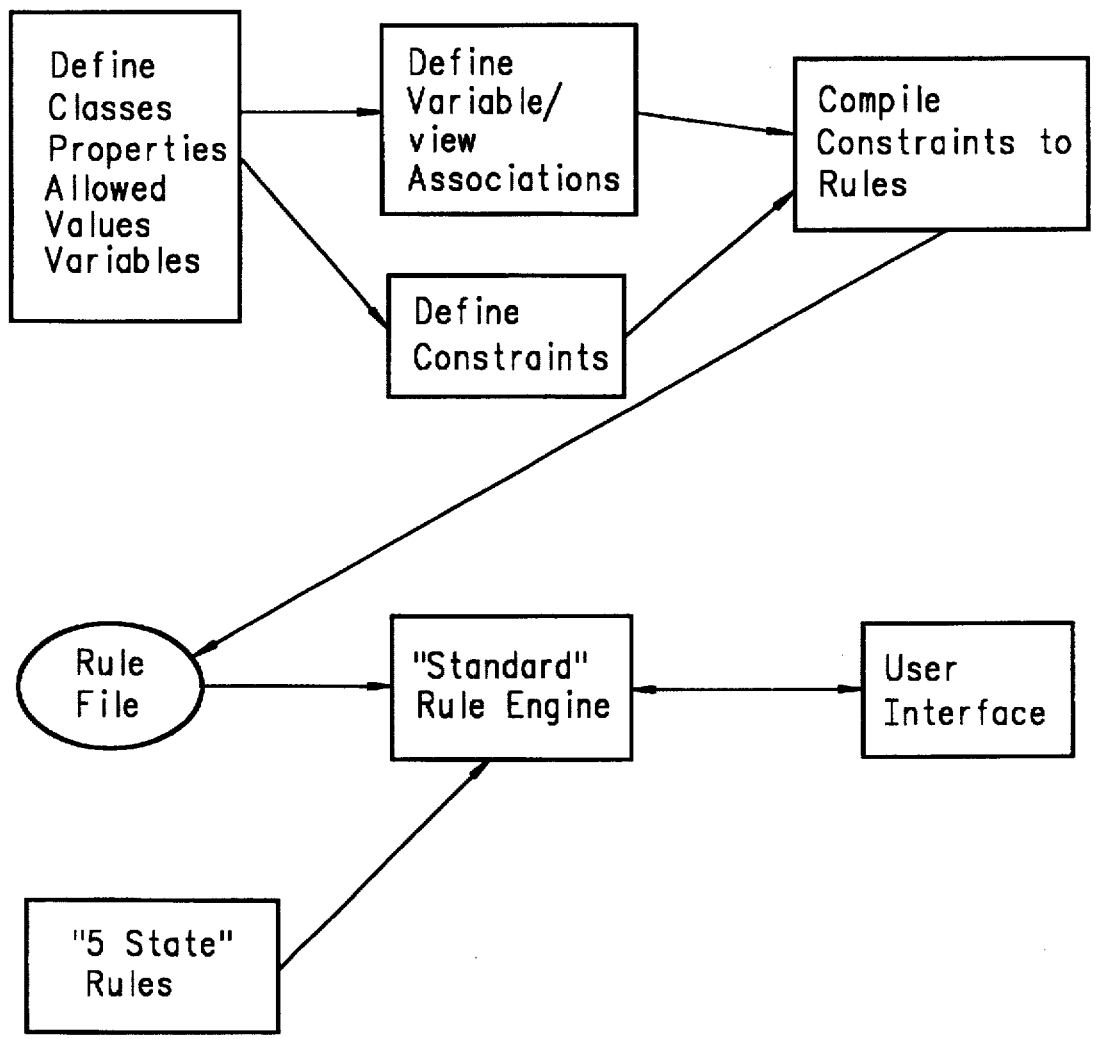
FIG. 5 is a flow diagram of a product configuration process in accordance with the invention.

The invention can be summarized in the flow diagram of FIG. 5. The algorithm expressed in the flow diagram can be summarized as follows:

Algorithm
Define Classes
Define Properties
Define Allowed Values
Define Variables
Define Constraints
Define Variable/View Associations
Layout Views on Windows
Compile (produce rule file)
Run (Have standard rule engine load rule file+5 state rules)
Interact (Have user interact with standard rule engine through the User interface)
Define Classes
 For each class, Enter
  the class's name
  the class's parent class
Define Properties
 For each property, Enter
  the property's name
  the property's associated class
  the property's type (symbol, string, integer, float, set or enumeration)

the property's default value
"5 State"—Selectable, Selected, Eliminated, Contradicted, User Selected The various cases of inputs and outputs in the following algorithm are summarized in the following table:

f) identifying for each eliminated or contradicted component specific properties of other components which contradict or eliminate said each component, including identifying selectable components versus eliminated

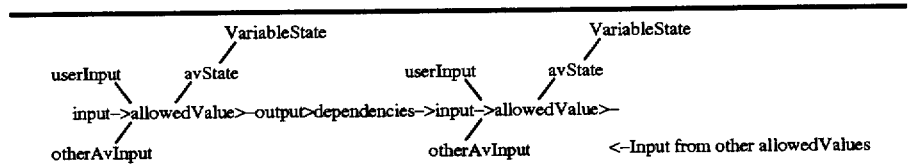

The table below is constructed so that on a per allowedValue, avState, VariableState basis, rules have no feed-back (e.g., output == selected => input == eliminated on the same group). We do this to keep from inadvertently "storing state."

|  |  |  | INPUTS | | | OUTPUTS | | |
| --- | --- | --- | --- | --- | --- | --- | --- | --- |
| case | MLT | INF | otherAvInput | usrInpt | input | output | avState.srcavState.value | |
| 0 | y | * | don'tCare | select~ | select~E~ | none | input | selectable |
| 1 | y | * | don'tCare | select~ | select+E~ | select | input | select |
| 2 | * | * | don'tCare | select~ | select~E+ | eliminate | input | eliminate |
| 3 | * | * | don'tCare | select~ | select+E+ | none | input | contradiction |
| 4 | y | * | don'tCare | select | select*E~ | select | userInput | select |
| 5 | * | * | don'tCare | select | select*E+ | select | userInput | selectContradiction |
| 0d | n | n | select~ | select~ | select~E~ | none | input | selectable |
| 0a | n | y | select~E+~ | select~ | select~E~ | none | input | selectable |
| 0b | n | y | select~E++ | select~ | select~E~ | select | input | select ;sherlock holmes |
| 0c | n | *? | select+E* | select~ | select~E~ | eliminate | input | eliminate |
| 1a | n | * | select~E* | select~ | select+E~ | select | input | select |
| 1b | n | * | select+E* | select~ | select+E~ | none | input | contradiction |
| 4a | n | * | select~E* | select | select*E~ | select | userInput | select |
| 4b | n | * | select+E* | select | select*E~ | select | userInput | selectContradiction |

| | | | |
| --- | --- | --- | --- |
| select~ | -1 | E~ | no eliminated input |
| select* | -0,1 | E+~ | at least one of other inputs is not eliminated |
| select+ | at least 1 | E++ | is where all other inputs are eliminated |
| select~ | 0 | MLT | multiple selectable |
| E* | at least on eliminated input | Src | source |
| E+ | 1 eliminated input | av | available |

There has been described a computer method and apparatus for configuring a product from a plurality of selectable items which facilitates the identification of eliminated or contradicted items and the altering of product configuration to avoid eliminated and contradicted components. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A computer implemented method for configuring a product from a plurality of selectable components comprising the steps of:

a) establishing for each component a list of available classes, b) defining specific properties for each class of each component, c) defining constraints among components based on said specific properties, including establishing Boolean relationships between components using said specific properties as constrained variables, d selecting a first plurality of components for a product configuration, e) identifying each of said first plurality of components as selectable, eliminated, or contracted based on said constraints, f) identifying for each eliminated or contradicted component specific properties of other components which contradict or eliminate said each component, including identifying selectable components versus eliminated components as specific properties as other components are altered thereby guiding in product reconfiguration, and g) altering said product configuration to avoid eliminated or contradicted components.

2. The method as defined by claim 1 wherein said Boolean relationships between components are based on positive constraint definitions of requisite configuration rules.

3. The method as defined by claim 1 wherein step f) includes selecting an eliminated component and identifying items which participate in eliminating the component.

4. The method as defined by claim 1 wherein step f) variables have default values, constraints are propagated by selecting a default on a per variable basis.

5. The method as defined by claim 4 wherein a computer user selects a default.

6. The method as defined by claim 4 wherein a computer system dynamically picks a default based on a class ordering.

7. The method as defined by claim 4 wherein step e) includes identifying each component with a radio button map of a filled symbol for selected, non-filled symbols as selectable, and a partially filled symbol as eliminated.

8. The method as defined by claim 4 wherein step e) includes identifying each component with a filled symbol for selected, a non-filled symbol as selectable, and an X-symbol as eliminated.

9. The method as defined by claim 1 wherein step e) includes identifying each component with a radio button map of a filled symbol for selected, non-filled symbols as selectable, and a partially filled symbol as eliminated.

10. The method as defined by claim 1 wherein step e) includes identifying each component with a filled symbol for selected, a non-filled symbol as selectable, and an X-symbol as eliminated.

11. A computer program product embedded in a tangible medium for use in a computer system for configuring a product from a plurality of selectable components, said program product comprising
   a) computer code establishing a list of available classes for each component,
   b) computer code defining specific properties for each class of each component,
   c) computer code defining constraints among components based on said specific properties,
   d) computer code instructions operable with said computer system for selecting a first plurality of components based on said specific properties;
   e) computer code instructions operable with said computer system for identifying each of said first plurality of components as selectable, eliminated, or contradicted based on said constraints,
   f) computer code instructions operable with said computer system for identifying for each eliminated or contradicted component specific properties of other components which contradict or eliminate said each eliminated or contradicted component, including selectable components versus eliminated components as specific properties as other components are altered thereby guiding in product reconfiguration, and
   g) computer code instructions operable with said computer system for altering said product configuration to avoid eliminated or contradicted components.

12. The computer program product as defined by claim 11 wherein said Boolean relationships between components are based on positive constraint definitions of requisite configuration rules.

13. The computer program product as defined by claim 11 wherein said f) instructions select an eliminated component and identifies items which participate in eliminating the component.

14. The computer program product as defined by claim 11 wherein variables in f) have default values, constraints are propagated by selecting a default on a per variable basis.

* * * * *